(12) United States Patent
Tsitron

(10) Patent No.: US 9,169,827 B2
(45) Date of Patent: Oct. 27, 2015

(54) APPARATUS FOR GENERATING ELECTRICITY FROM WIND POWER

(71) Applicant: Ilya Tsitron, Brooklyn, NY (US)

(72) Inventor: Ilya Tsitron, Brooklyn, NY (US)

( * ) Notice: Subject to any disclaimer, the term of this patent is extended or adjusted under 35 U.S.C. 154(b) by 139 days.

(21) Appl. No.: 14/011,893

(22) Filed: Aug. 28, 2013

(65) Prior Publication Data

US 2014/0008917 A1  Jan. 9, 2014

Related U.S. Application Data

(63) Continuation-in-part of application No. 13/337,157, filed on Dec. 26, 2011, now Pat. No. 8,546,971.

(51) Int. Cl.
| | | |
|---|---|---|
| *F03D 9/00* | (2006.01) | |
| *H02P 9/04* | (2006.01) | |
| *F03D 3/00* | (2006.01) | |
| *F03D 1/00* | (2006.01) | |
| *F03D 1/04* | (2006.01) | |

(52) U.S. Cl.
CPC *F03D 3/005* (2013.01); *F03D 1/00* (2013.01); *F03D 1/04* (2013.01); *F03D 9/002* (2013.01); *F05B 2240/121* (2013.01); *F05B 2240/131* (2013.01); *F05B 2240/40* (2013.01); *Y02B 10/30* (2013.01); *Y02E 10/72* (2013.01)

(58) Field of Classification Search
CPC .......... F03D 3/005; F03D 9/002; F03D 1/00; F03D 1/04; F03D 3/00; F03D 9/00; F05B 2240/121; F05B 2240/131; F05B 2240/40; Y02E 10/72; Y02E 10/74; Y02B 10/30
USPC ......................................... 290/55, 54, 42–44
See application file for complete search history.

(56) References Cited

U.S. PATENT DOCUMENTS

| | | | | |
|---|---|---|---|---|
| 4,452,046 | A | * | 6/1984 | Valentin ..................... 60/641.11 |
| 5,394,016 | A | * | 2/1995 | Hickey ............................ 290/55 |
| 7,172,386 | B2 | * | 2/2007 | Truong et al. .................. 415/4.1 |

* cited by examiner

*Primary Examiner* — Javaid Nasri

(57) ABSTRACT

An apparatus for generating electricity from wind power includes a turbine having an impeller rotatable about a substantially vertical axis and having a plurality of blades, a wind redirecting element which redirects the wind around the blades, a generator connected with the turbine and generating electricity in response to rotation of the impeller about the substantially vertical axis under an action of wind, a wind directing element which directs the wind into an interior of the apparatus, and a wind guiding device located under the turbine and guiding the wind substantially upwardly toward the turbine.

31 Claims, 13 Drawing Sheets

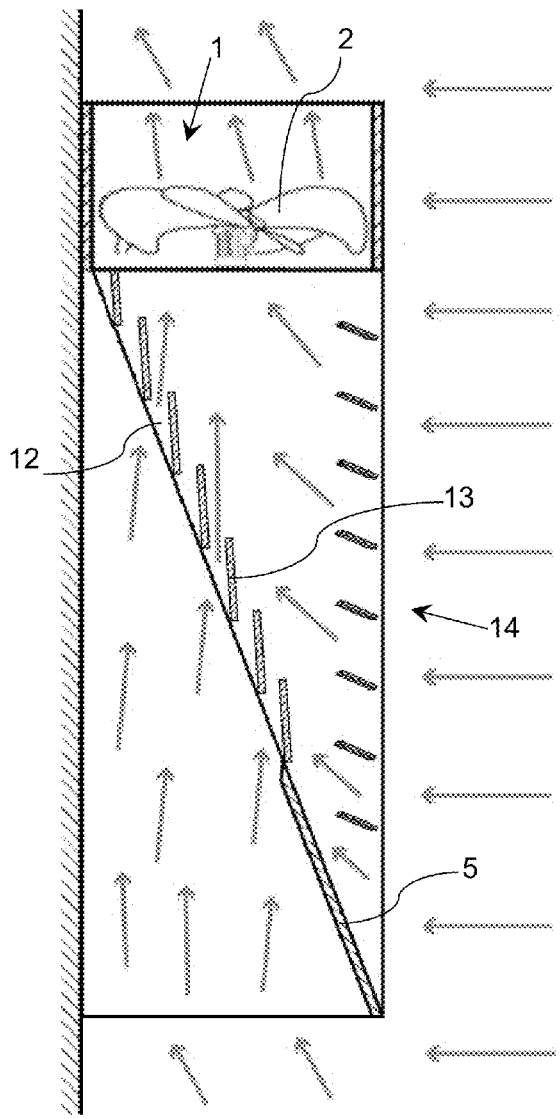
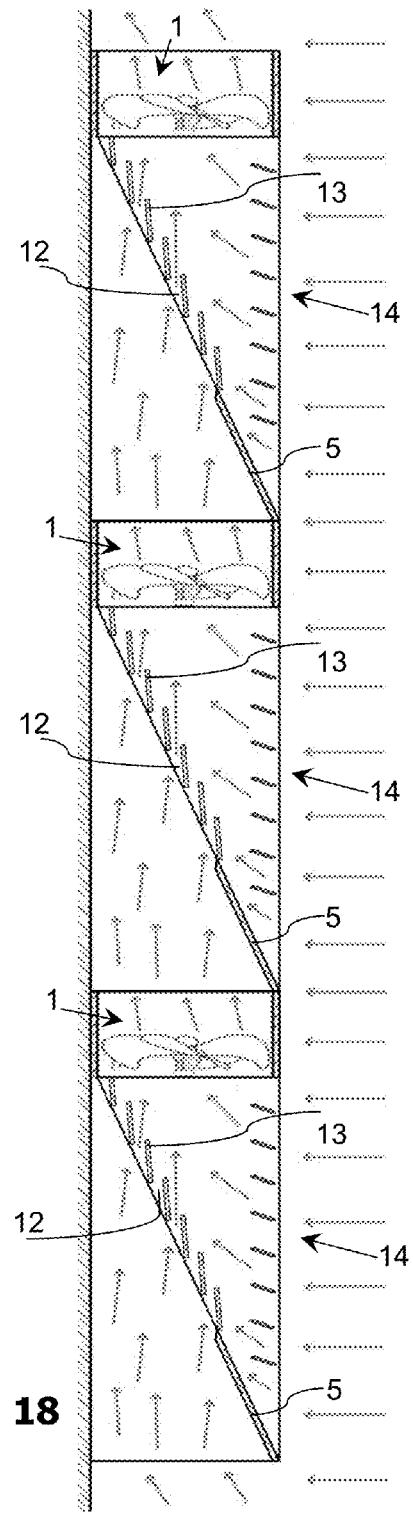
Fig. 17
Fig. 18

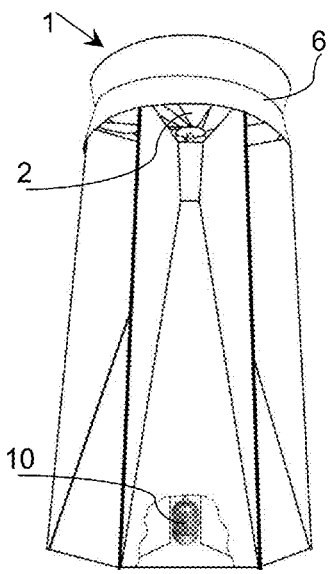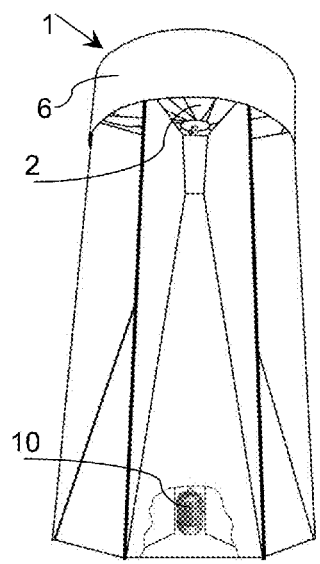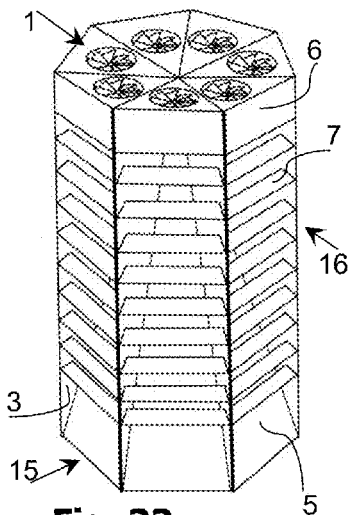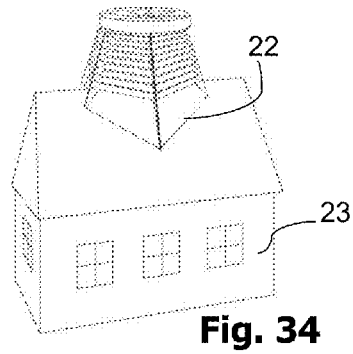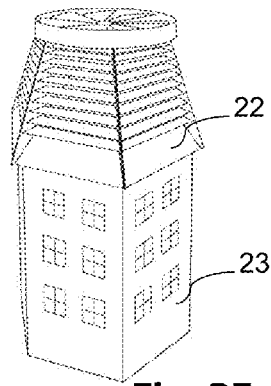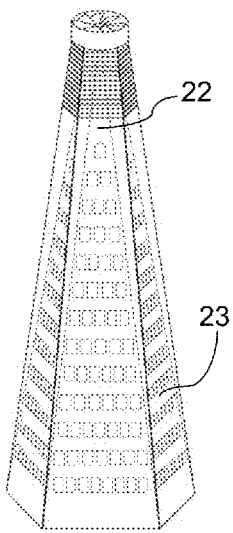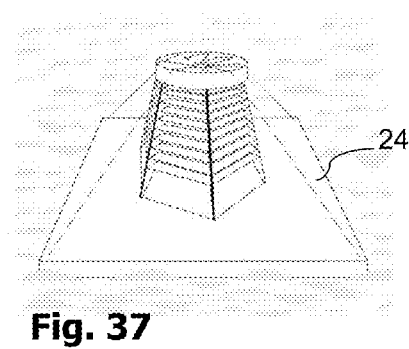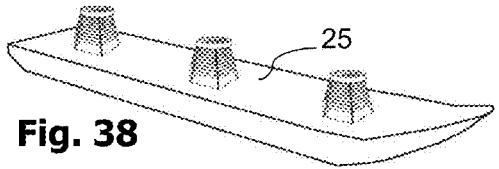

APPARATUS FOR GENERATING ELECTRICITY FROM WIND POWER

CROSS-REFERENCE TO A RELATED APPLICATION

This patent application is a Continuation-In-Part of U.S. patent application Ser. No. 13/337,157 filed on Dec. 26, 2011 which is incorporated in this application by reference thereto and from which the present application claims its priority under 35 USC 119 (a)-(d).

BACKGROUND OF THE INVENTION

The present invention relate to an apparatus for generating electricity from wind power.

There are many apparatuses for generating electricity from wind power, which have been developed and manufactured and are currently in use. It is believed that there is a need in apparatuses that are more efficient in capturing energy from wind, with significantly reduced dimensions, reduced manufacturing, installation, and servicing costs, easily installable in any populated areas and on rooftops, while being appealing to most and safe for people, animals, and birds.

An apparatus which has been designed with this in mind is disclosed in our patent application Ser. No. 13/337,157 filed on Dec. 26, 2011

SUMMARY OF THE INVENTION

Accordingly, it is an object of the present invention to provide an apparatus for generating electrical energy from wind power, which is a further improvement of the apparatuses of this type.

In keeping with these objects and with others which will become apparent hereinafter, one feature of the present invention resides briefly stated in an apparatus for generating electricity from wind power, comprising a turbine having an impeller rotatable about substantially vertical axis and having a plurality of blades, a wind redirecting element which redirects the wind around said blades, a generator connected with said turbine and generating electricity in response to rotation of said impeller about a substantially vertical axis under an action of wind, a wind directing element which directs the wind into an interior of the apparatus, and a wind guiding device located under said turbine and guiding the wind substantially upwardly toward said turbine.

In accordance with a further feature of the present invention, wind directing element extends upright and vertically and is located under one side of said turbine and extends in its entirety uninterruptedly within a width of the turbine and from a lower end of the whole apparatus up to a bottom of the turbine.

The wind directing element can have an additional further wind directing element which extends upright and vertically and located under the opposite side of said turbine and extends in its entirety uninterruptedly within the width of the turbine and from a lower end of the whole apparatus up to a bottom of the turbine.

The wind guiding device can include a wind guiding element attached to the wind directing element, and selected from the group consisting of at least one wind guiding element extending substantially upright, at least one wind guiding element extending substantially sideways, and both.

The wind redirecting element can have a peripheral wall surrounding said impeller and selected from the group consisting of a straight wall, a curved wall, a one-part wall, a multi-part wall, and a wall located at an angle to a vertical plane.

The location of said generator connected with said turbine can be selected from the group consisting of location under said turbine, and inside of said turbine's impeller.

The at least one substantially upright wind guiding element can be located under said impeller of said turbine, is inclined relative to a vertical plane and directs the wind from below upwardly toward said impeller of said turbine rotatable about the substantially vertical axis, wherein said wind guiding element is inclined relative to a vertical plane, has a lower end and upper end, and extends in its entirety uninterruptedly from said lower end to said upper end, and also from a lower end of the whole apparatus towards said bottom of the turbine, so that the wind is guided from below upwardly over and along said inclined element from said lower end to said upper end of said element and from said lower end of the whole apparatus towards said bottom of the turbine uninterruptedly, and wherein said wind guiding device is open at one side opposite to said uninterrupted inclined wind guiding element so that wind flows from outside onto said uninterrupted inclined wind guiding element over its whole height and is guided upwardly.

The wind guiding element which extends substantially sideways can include a plurality of wind guiding plates which are spaced from one another in a substantially upright direction and inclined to a horizontal plane for guiding the wind upwardly toward said turbine, and wherein said wind guiding plates are plates selected from the group consisting of flat plate, plates curved in one side direction, and plates curved in another transverse side direction.

The at least one wind guiding element extending upwardly together with the wind directing elements can form a wind channel, such that said wind guiding plates guide the wind from outside into said wind channel upwardly towards said turbine. The wind guiding plates can be elongated, each have an axis extending along a length of each of said wind guiding plates, and are turnable around said axis to adjust an amount and a direction of wind guided by said wind guiding plates and to block the wind flow into said wind channel when wind is excessive.

The wind guiding element which extends substantially upright can be an element selected from the group consisting of a vertical element, an element inclined to a vertical plane, a flat element, a vertically curved element, a horizontally curved element, and combinations thereof.

The wind guiding device can form together with said wind directing element a unit. A plurality of such units can be arranged adjacent to one another in a peripheral direction around the vertical axis over a whole circumference forming the multi-unit circular apparatus, so as to allow the wind to enter said multi-unit circular apparatus from all sides and to be directed upwardly. The multi-unit circular apparatus can have a turbine selected from a group consisting of one impeller for each of said units, and a single impeller for the entire multi-unit circular apparatus with single impeller's axle located at the center of said multi-unit circular apparatus. The extending upwardly wind guiding elements of said units together can form a conical structure.

The wind directing elements can extend from a periphery in a direction toward said vertical axis to a center of said circular apparatus and are connected in said center in a manner selected from the group consisting of connected with each other, connected to a single central element having a cross-section selected from a group consisting of circular cross-section and multisided cross-section, and both.

A wind deviating means can be further provided to increase impeller's efficiency, located in the area of said impeller's blades and constructed such that said wind deviating means prevent the wind guided by said wind guiding device from being directed toward a central part of said impeller located close to said axis and deviate the wind guided by said wind guiding device exclusively toward a remaining part of said impeller which is spaced from said axis. The wind deviating means can have a wind deviating element selected from the group consisting of a wind deviating element connected with said central part of said impeller, a wind deviating element connected with said wind guiding device, and both, each of said wind deviating elements can be selected from the group consisting of a vertical element, an element inclined to a vertical plane inwards or outwards, a separate element, an element which is of one piece with said turbine, and an element which is one piece with said wind guiding device.

The impeller of said turbine can have a central cone which is the wind deviating element connected with said central part of the impeller, expanding upwardly and rotatable about said impeller's axis, which slides the wind away from said impeller's axis toward said blades, with said blades attached to a surface of said central cone along a line selected from a group consisting a curved line and a straight line.

The apparatus can further comprise a substantially vertical supporting element, wherein said multi-unit circular apparatus with said turbine, said generator, said wind guiding device and turbine's axle can be arranged on top of said supporting element and supported by the latter.

In accordance with another embodiment, said turbine's impeller can be located on one side of said supporting element, while said generator is located on another opposite side of said supporting element and connected with said impeller by said turbine's axle rotatable around substantially horizontal axis, forming the horizontally rotating apparatus, while the whole apparatus rotates horizontally about a substantially vertical axis of said supporting element in a direction of wind flow under the action of wind.

The impeller of the horizontally rotating apparatus has a central cone which is the wind deviating element connected with said central part of the impeller, while the entire horizontally rotating apparatus is rotatable around a substantially vertical axis of said supporting element in the direction of the wind flow, under the action of wind. The generator of the horizontally rotating apparatus can be located inside of said impeller's central cone, while the counterweight is located on another opposite side of said supporting element.

The central cone of the impeller of the horizontally rotating apparatus can be formed as an enclosed large hollow element made out of light flexible material, which can be inflated by lighter than air gases that will force the entire apparatus to float above the earth surface, wherein the generator can be located inside or outside of the central cone, and in the areas of it's narrow edge, it's center, or it's wide edge, while the entire apparatus is connected to the earth surface through a supporting frame and a cable connected to said supporting frame and is rotatable substantially horizontally around the connection with the cable in a direction of wind flow under the action of wind, and the electricity produced by the apparatus is transferred to the earth surface through the supporting frame and the cable.

The upwardly extending wind guiding element can have a plurality of openings and a plurality of further substantially upwardly guiding elements associated with said openings, so that wind entering said apparatus from below is directed upwardly through said openings toward said impeller of said turbine rotatable about the substantially vertical axis forming a stackable unit. A plurality of said stackable units can be arranged over one another in a vertical direction in a position selected from a group consisting of adjacent to a wall and free-standing forming a multi-level stackable unit.

A plurality of said multi-level stackable units can be arranged adjacent to one another in a peripheral direction around the vertical axis over a whole circumference, and having an axle extending through all said stackable units and formed as an axle selected from the group consisting of a single axle extending through all said stackable units and an axle composed of interconnected individual axles of said stackable units, and wherein said generator is selected from a group consisting of a single generator connected to said single axle for all stackable units and a single generator for each stackable unit, and forming a circular multi-level stackable apparatus.

In the apparatus each of said blades of said impeller of said turbine can be also turnable around its axis, to adjust a speed of wind passing through said turbine, to increase a performance of the apparatus, and to decrease or stop a the rotation of said impeller.

The apparatus as a whole is constructed as an apparatus selected from the group consisting of an apparatus arrangeable on a vertical support, an apparatus attachable to a wall, an apparatus forming a part of an occupyable structure, an apparatus arranged on a floatable platform as a power station, a self-powered navigation buoy or a lighthouse, and an apparatus arranged on a ship as a source of its electrical power and thrust.

In the apparatus said wind redirecting element, said wind directing element, and said wind guiding device can be provided with solar panels on their surface forming parts of solar cells, and can be constructed without solar panels on their surface. The apparatus can be also provided with a bird-protecting element.

The new features of the present invention are set forth in particular in the appended claims. The invention itself, however, will be best understood from the following description of the preferred embodiment, which is accompanied by the following drawings.

BRIEF DESCRIPTION OF THE DRAWINGS

FIGS. 17-21 are vertical cross-sectional views of the inventive apparatus showing further embodiments of the wind guiding device with openings provided in the wind-guiding elements and with the wind deviating element;

FIGS. 31 and 32 are perspective views showing the inventive apparatus with said single impeller for the entire multi-unit structure, said generator, and further embodiments of the wind redirecting elements;

FIG. 33 is a perspective view of the inventive apparatus in accordance with a further embodiment of the multi-unit structure;

FIGS. 34-38 are perspective views of the inventive apparatus in accordance with different embodiments of its installation on various functional objects;

DESCRIPTION OF THE PREFERRED EMBODIMENTS

Figure 1:
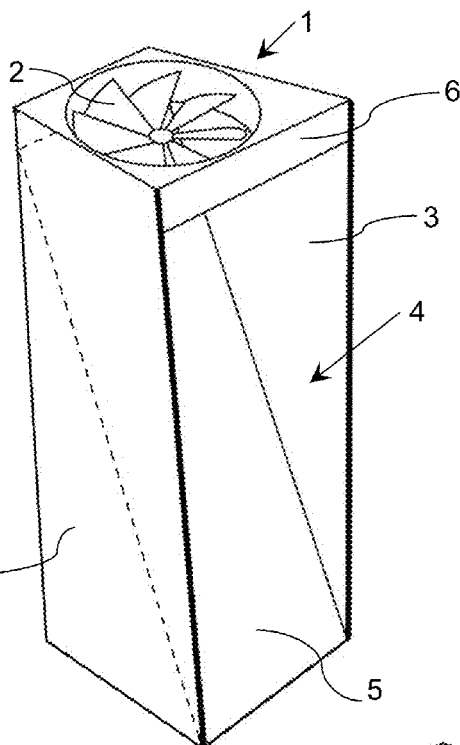
FIG. 1 is a perspective view of an inventive apparatus for generating electricity from wind power, provided with a wind directing element and a wind redirecting element.

An apparatus for generating electricity from wind power shown in FIG. 1 has a turbine 1 with an impeller 2 rotatable about a substantially vertical axis and having a plurality of blades. It further has two wind directing elements 3 which direct wind into the interior of the apparatus and formed here as substantially vertically extending wind directing elements. The apparatus is also provided with a wind guiding device 4 which is located under the turbine 1 and guides the wind substantially upwardly toward the turbine. In the embodiment of FIG. 1 the wind guiding device has an inclined wind guiding element 5 extending substantially upwardly. Finally, the apparatus has a wind redirecting element 6 which redirects wind around the blades of the impeller 2 of the turbine 1. The wind redirecting element 6 in this embodiment is formed as an upper part of the apparatus, which peripherally surrounds the turbine 1 and is composed here of the upper regions of the elements 3, 5 and 3 and a front strip which connects the upper regions of the elements 3, 3 with one another.

In operation the wind enters the apparatus from the right side is directed upwards by the laterally located vertical wind directing elements 3 and the inclined wind guiding element 5 toward the turbine 1 and redirected by the redirecting element 6 around the blades of the impeller 2 of the turbine 1. The rotation of the turbine 1 is transmitted to a rotatable shaft of an electrical generator which generates electrical energy, as will be explained herein below.

At least one of the wind directing elements 3 or both of them extend upwards and vertically and are located at opposite sides of the turbine 1, and also extend in their entirety uninterruptedly within the width of the turbine 1 and from the lower end of the apparatus up to the bottom of the turbine 1.

Figure 2:
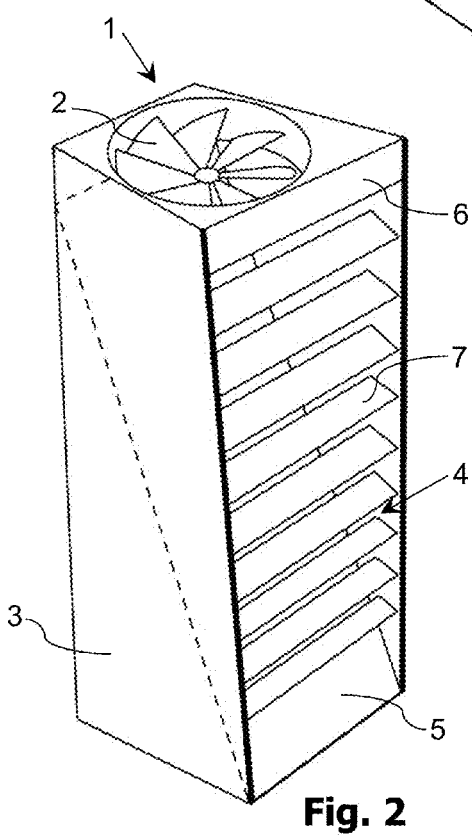
FIG. 2 is a perspective view of the inventive apparatus of FIG. 1 provided additionally with a plurality of wind guiding blades.

In the apparatus shown in FIG. 2 the wind guiding device 4 additionally has a plurality of wind guiding elements which extend substantially sideways and are formed as wind guiding plates 7 spaced from one another in an upright direction and inclined to a horizontal plane to guide the wind upwardly toward the turbine 1. The apparatus shown in FIG. 3 substantially corresponds to the apparatus shown in FIG. 2, but with the wind guiding element 5 which is substantially vertical and located on the opposite side from said wind guiding plates and an open side of the apparatus.

Figure 3:
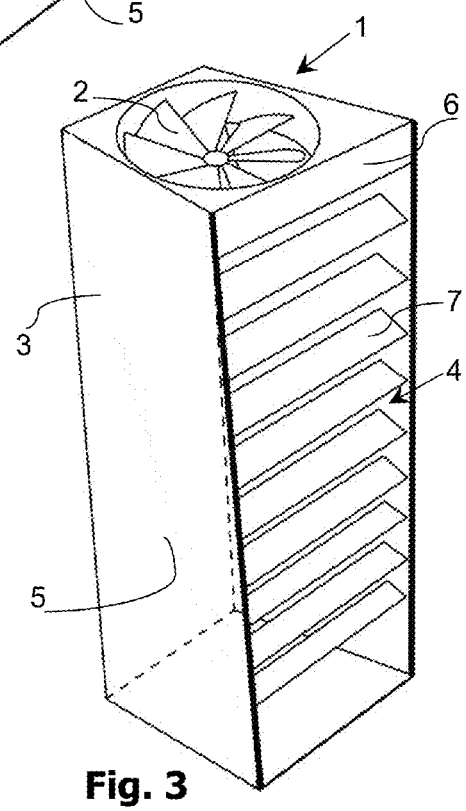
FIG. 3 is a perspective view of the inventive apparatus provided with the wind redirecting element and with a plurality of wind guiding blades.
Figures 4, 5:
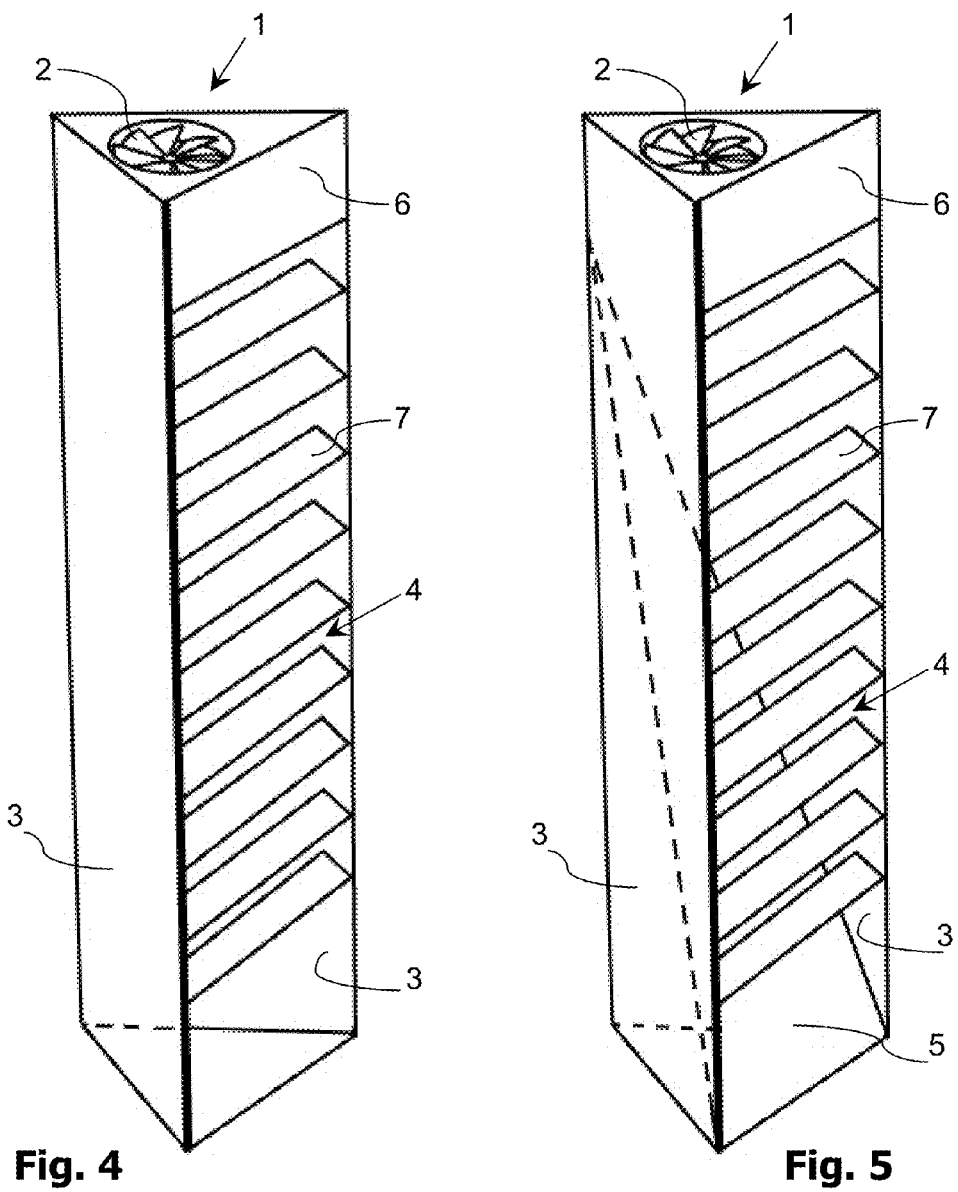
FIGS. 4 and 5 are perspective views showing two further embodiments of the inventive apparatus with a wind directing element and a wind guiding element respectively.
Figure 6:
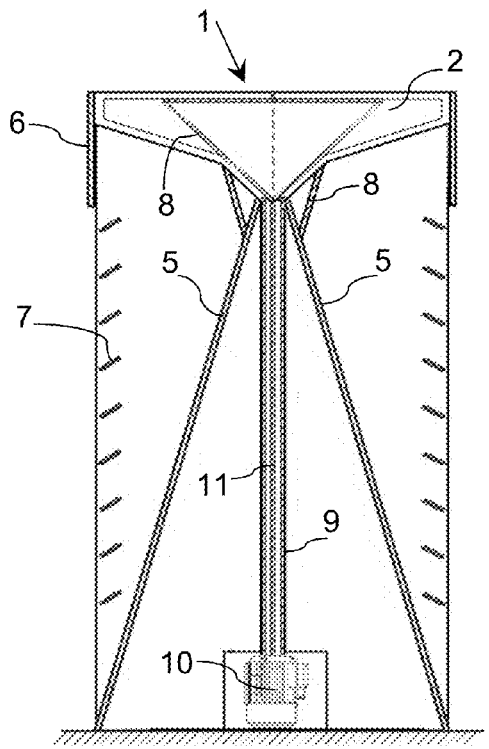
FIGS. 6-16 are vertical cross-sectional views of the inventive apparatus showing several embodiments a wind deviating element and a wind guiding device.
Figure 7:
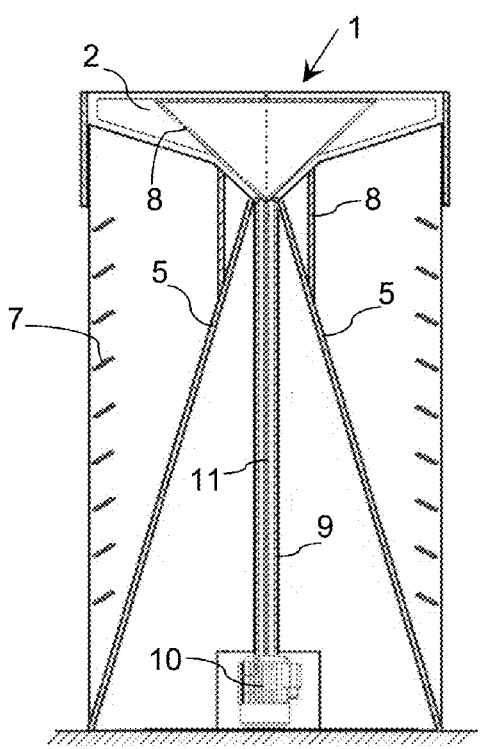
Figure 8:
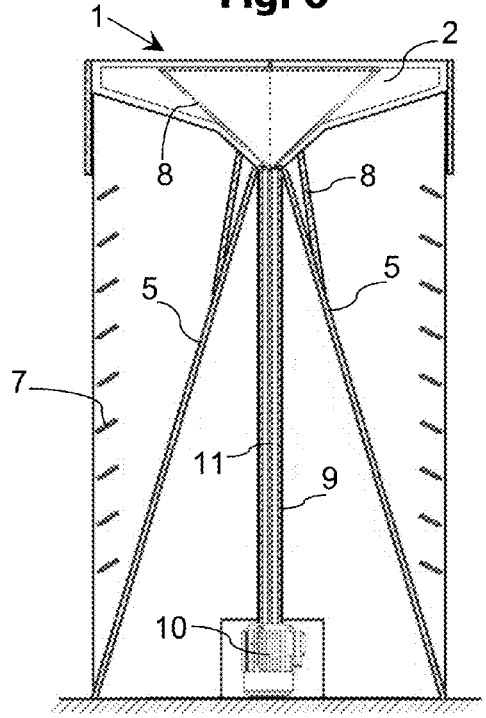
Figure 9:
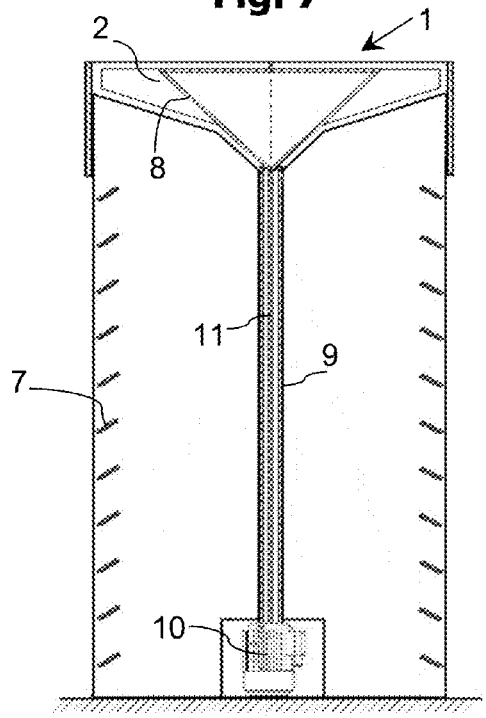
Figure 10:
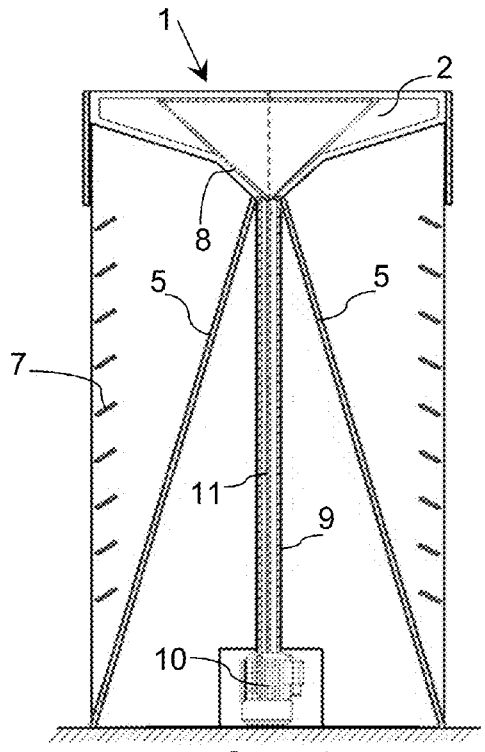
Figure 11:
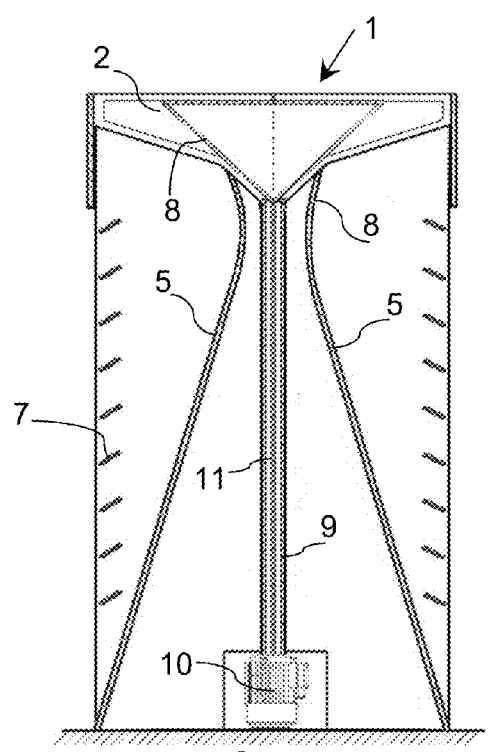

The apparatus shown in FIG. 4 substantially corresponds to the apparatus of FIG. 3, but instead of a substantially rectangular cross section in a horizontal plane, has a triangular cross section without the back guiding wall. The apparatus shown in FIG. 5 substantially corresponds to the apparatus of FIG. 2, but also has a triangular cross section in the horizontal plane.

The apparatuses with wind deviating elements which deviate the wind so that the wind does not impact the central area of the impeller to increase impeller's efficiency but is deviated toward its blades are shown in FIGS. 6-14. In the embodiments shown in FIGS. 6, 7 and 8 the wind deviating elements 8 are attachable to the wind guiding elements 5 are expanding upwardly, extending vertically and narrowing upwardly correspondingly. In the embodiments shown in FIGS. 9-14 the wind deviating elements 8 are formed as vertically expanding lower parts of the impeller 2 of the turbine 1. As can be seen from these Figs., the wind guiding elements 5 can be formed either as two inclined elements or as a single conical upwardly narrowing element. In the embodiments shown in FIGS. 12-14 the wind guiding elements 5 extends to the bottom of the turbine 1, or substantially below the bottom of the turbine 1 correspondingly.

Figure 12:
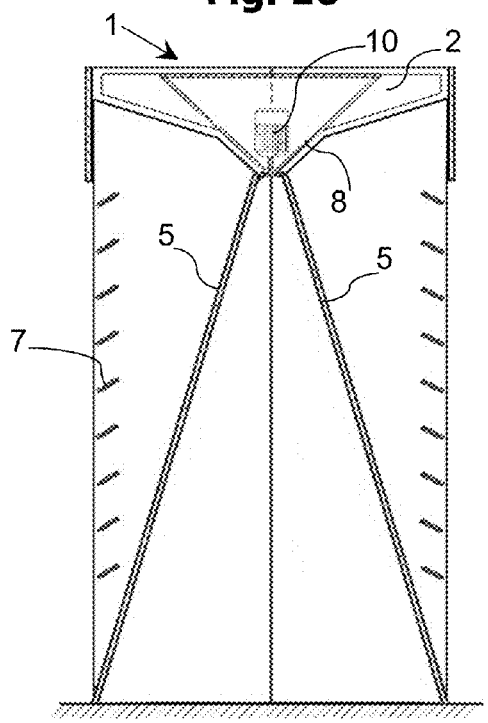
Figure 13:
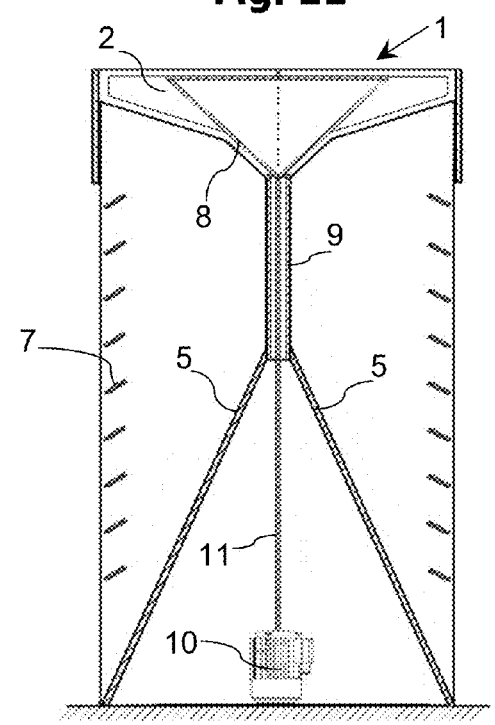
Figure 14:
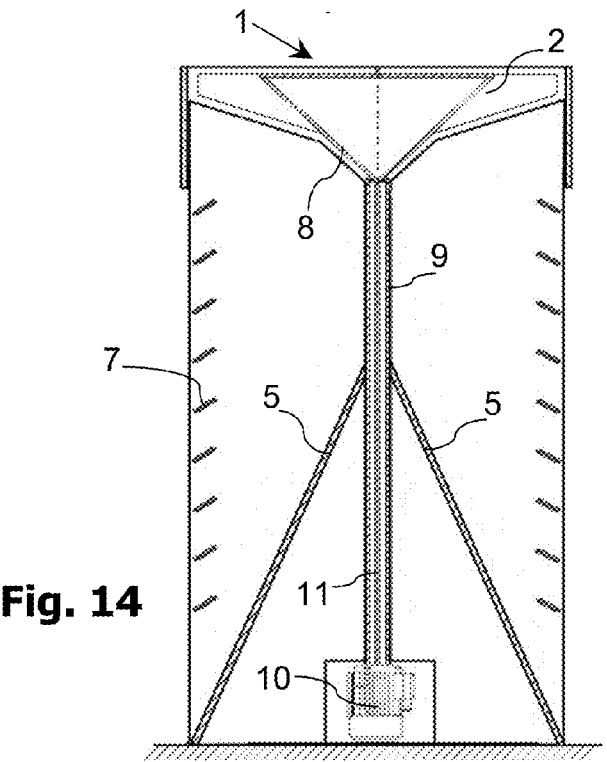
Figure 15:
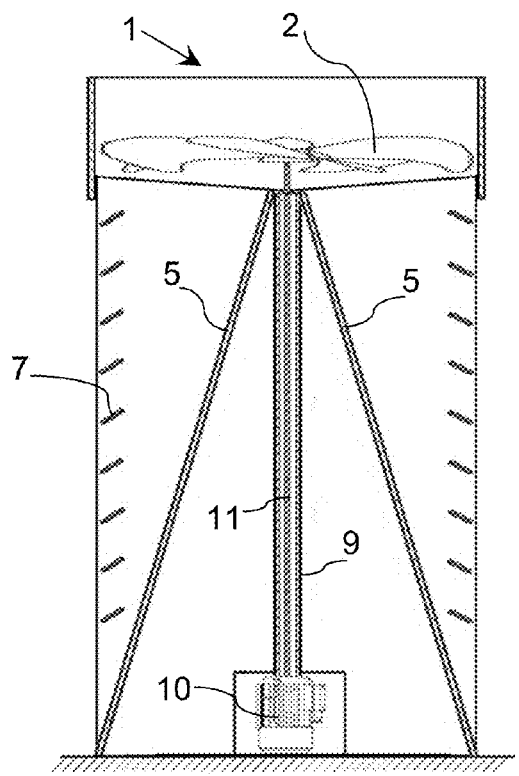

The apparatus is provided with an electrical generator 10 having a shaft which is connected with an axle or shaft of the impeller 2 of the turbine 1 and rotates in response to the rotation of the latter to generate electricity, as known in the art. The shaft 11 of the generator 10 can extend inside the tube 9. The generator 10 can be located under the turbine 1 and even close to the bottom of the apparatus, or inside the impeller 2 of the turbine 1 as shown in FIG. 12.

Figure 19:
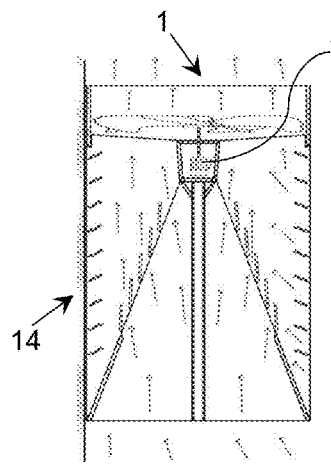
Figure 20:
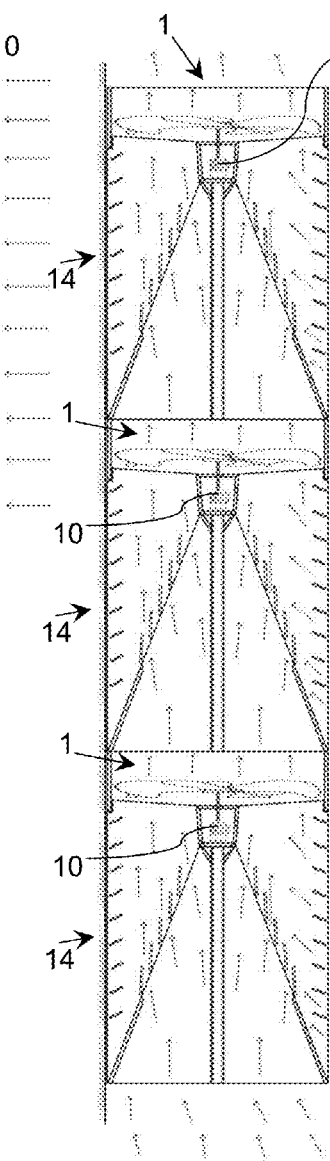
Figure 21:
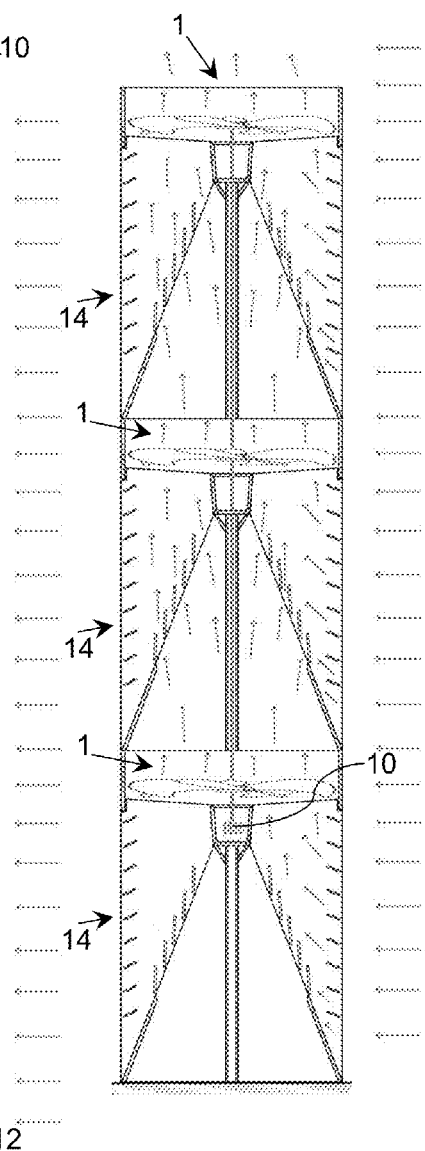
Figure 22:
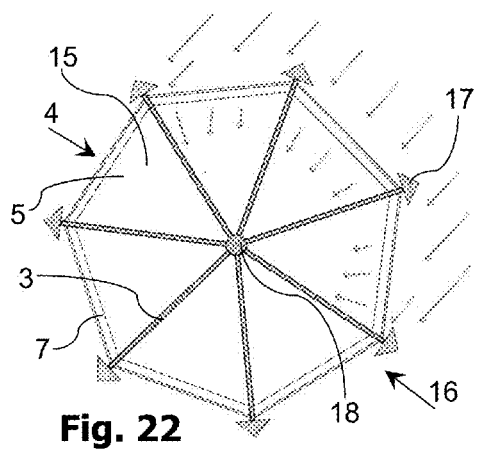
FIGS. 22-30 are plan views of the inventive apparatus showing several multi-unit embodiments with different configurations.
Figure 25:
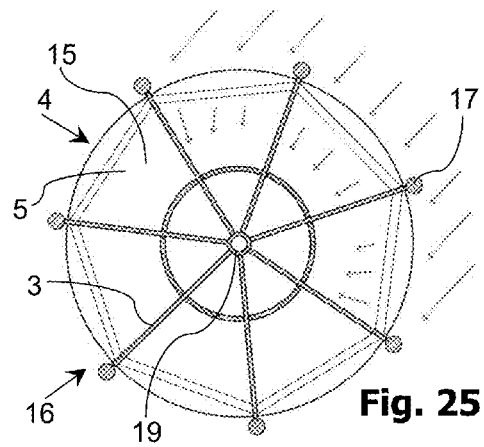
Figure 23:
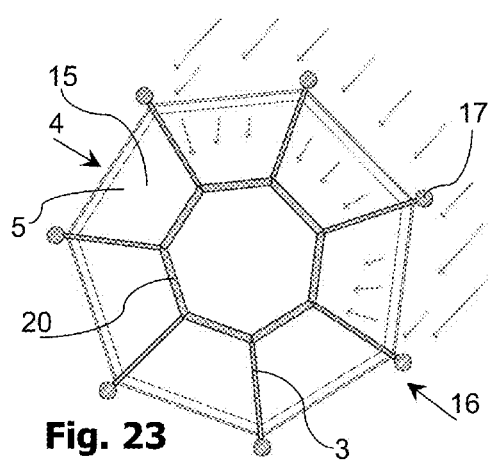
Figure 26:
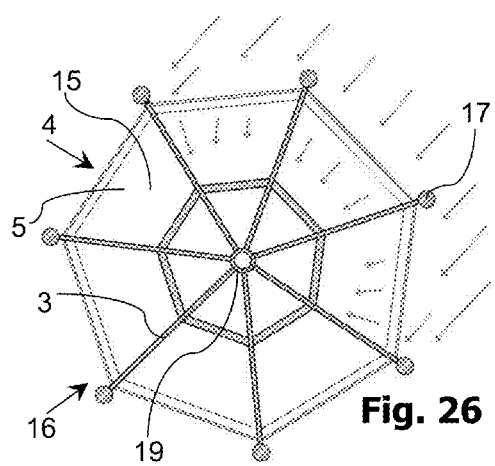
Figure 24:
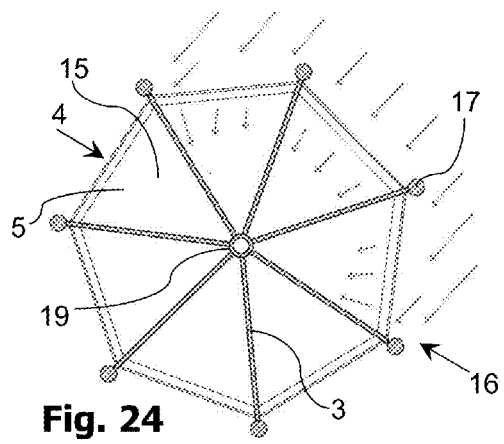
Figure 27:
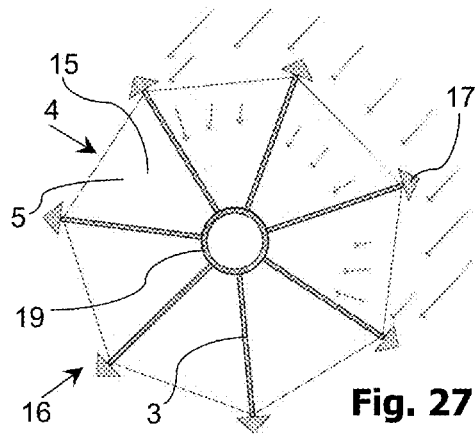

In the apparatus shown in FIGS. 17-21 the wind guiding elements 5 have a plurality of openings 12 and also substantially upwardly extending guiding elements 13 associated with the openings 12. The wind entering from below is directed upwards through the openings 12 toward the impeller 2 of the turbine 1, and a stackable unit 14 shown in FIGS. 17 and 19 is formed. A plurality of the stackable units 14 can be arranged over one another as shown in FIGS. 18, 20 and 21. The apparatus can be located adjacent to a wall (FIGS. 17-20) and can be free-standing (FIG. 21).

As can be seen from FIG. 20 in the apparatus composed of a plurality of stackable units 14 the generators 10 can be arranged in all units and can be each individually connected to the turbine 1 in each unit. In contrast, in the embodiment shown in FIG. 21 the generator 10 is a single generator for all stackable units 14, but its rotatable shaft is connected to all turbines located in all units 14.

The wind guiding device 4 and the wind directing element or elements 3 together form a unit 15 of the inventive apparatus. A plurality of the units 15 can be arranged adjacent to one another in a peripheral direction around a vertical axis over a whole circumference forming the multi-unit circular apparatus 16 as shown in horizontal cross-sections of FIGS. 22-27. When the apparatus is constructed in this way, wind can enter the multi-unit circular apparatus 16 from all sides to be directed upwardly toward the turbine 1.

The circular apparatus 16 can be provided with outer supports 17 on its periphery which can be circular, triangular, or other shape in their cross-section, and with a central solid support 18, a tubular support 19, a central circular, multi-cornered or other hollow structure 20, and combinations of the above. In the circular apparatus 16 the impellers 2 of the turbines 1 can be provided in each unit 15, or a single impeller 2 of the turbine 1 can be provided for the whole apparatus. The wind guiding elements 5 of the units 15 can form together a multi-unit conical structure as shown in horizontal cross-section of FIG. 25.

Figure 28:
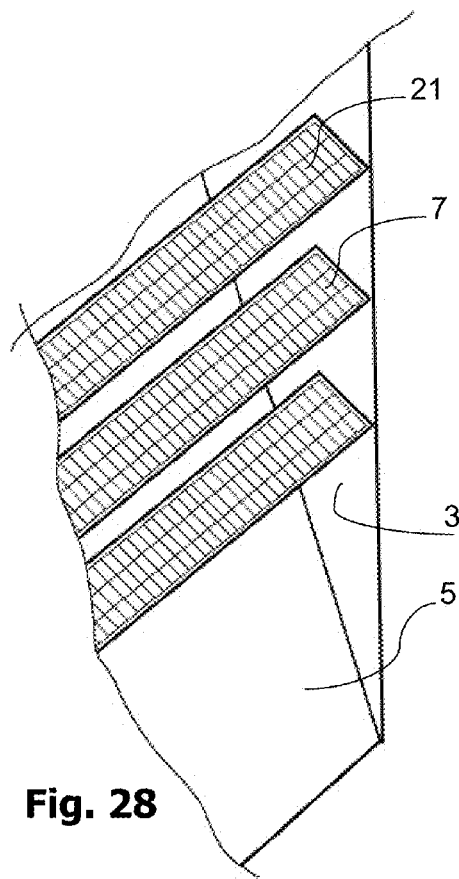
Figure 29:
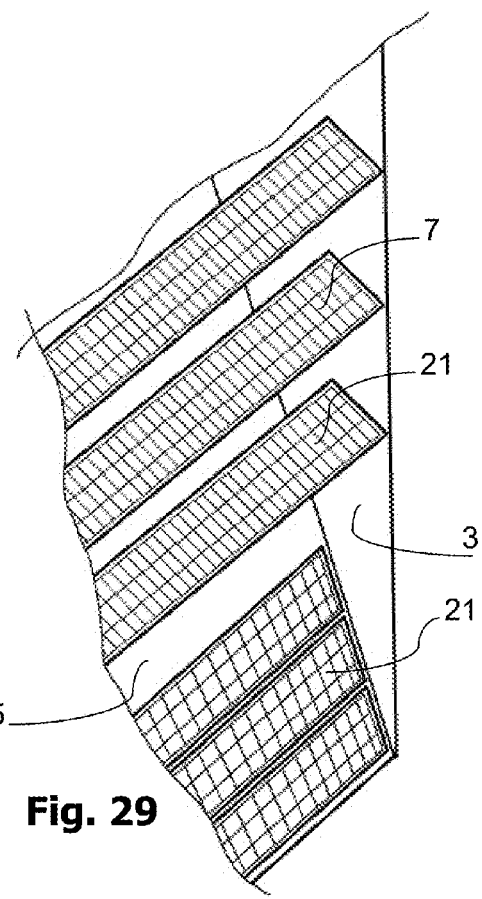
Figure 30:
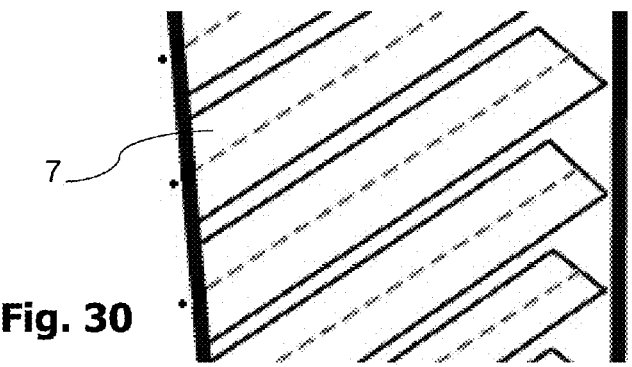

In the embodiments shown in FIGS. 28 and 29 the apparatus is provided with solar panels 21 which convert solar energy falling on them into electrical energy as well. In the embodiment shown in FIG. 28 the solar panels 21 are arranged on the wind guiding plates 7. In the embodiment shown in FIG. 29 the solar panels 21 are arranged not only on the winding guiding plates 7, but also on the wind guiding element 5. The wind guiding plates 7, with or without the solar panels 21, can be turnable about their longitudinal axes which extend in a transverse or substantially horizontal direction of the apparatus, as shown in FIG. 30.

FIGS. 31 and 32 show the inventive apparatus with the single impeller 2 of the turbine 1 for the entire multi-unit structure, one of the possible location of the generator 10, and the embodiments of the wind redirecting element 6 which can have a straight wall (FIG. 32), a curved wall (FIG. 31), a one-part wall (FIG. 32), a multi-part wall (FIG. 31), a wall located at an angle to a vertical plane (FIG. 31).

FIG. 33 shows on a perspective view of the multi-unit apparatus 16 with a plurality of the units 15 assembled to be adjacent to each other and forming the peripherally enclosed apparatus with each unit containing the turbine 1, the wind directing element 3, the wind guiding element 5, the wind redirecting element 6, and the wind guiding plates 7.

FIGS. 34-38 show the embodiments in which the apparatus in accordance with the present invention is associated with outside objects. The apparatus shown In FIGS. 34, 35 and 36 is a part of roofs 22 of an occupyable structure 23. The apparatus shown in FIG. 37 is arranged on a floatable platform 24 as the floating power station, as the self-powered navigational buoy or the lighthouse or combinations of the above. The apparatus shown in FIG. 38 is arranged on a ship 25 as a source of its electrical power and thrust.

It should be noted that the wind guiding plates 7 of the wind guiding device can be flat, curved in one side direction, in another transverse side direction. The wind guiding element 5 which extends upwardly and wind directing elements 3 form a wind channel, such that the wind guiding plates 7 together with the wind guiding element 5 guide the wind from outside into the wind channel upwardly toward the turbine 1. The turning of the wind guiding plates 7 about their axes is used for adjusting an amount and a direction of wind guided by them and also for blocking the wind flow into the wind channel if the wind is excessive.

Figure 16:
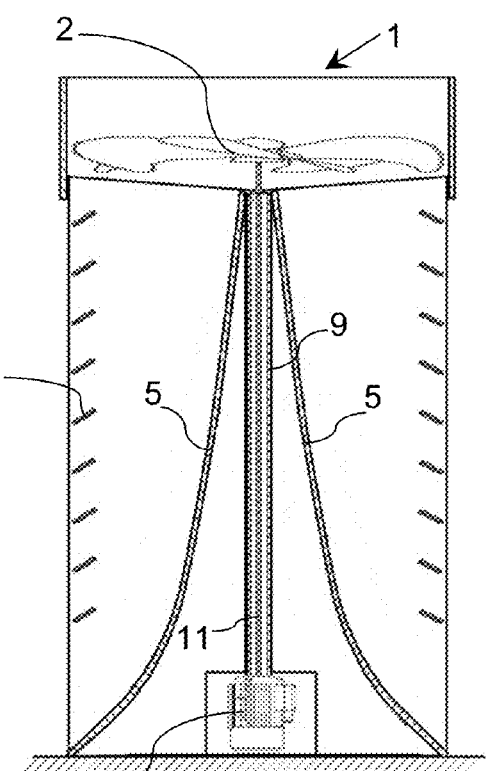

The wind guiding element 5 can be inclined to a vertical plane and flat (FIG. 1), can be vertical (FIG. 3), can be vertically curved (FIG. 16), can be horizontally curved (FIG. 16), or can have a combined shape. The wind directing elements 3 can extend from a periphery toward the vertical axis (FIGS. 22-27) and in the center connected with each other or to a central element of a circular (FIGS. 22, 24-27) or of a multi-cornered (FIG. 23) cross section.

The wind deviating elements of the wind deviating means 8 can be connected with the central part of the impeller 2, with the wind guiding element 5, and both, and can be vertical, inclined to a vertical plane inwardly or outwardly, formed as a separate element or of one-piece with the turbine 1 and with the wind guiding element 5 (FIGS. 6-14).

Figure 39:
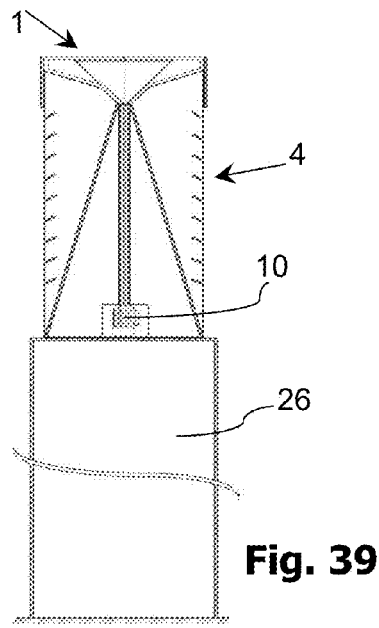
FIGS. 39-42 are front views on the inventive apparatus in accordance with further embodiments of its installation on respective supports.

The multi-unit circular apparatus with the turbine 1, the generator 10, the wind guiding device 4, and the axle of the turbine can be stationarily arranged on top of a supporting element 26 (FIG. 39).

Figure 40:
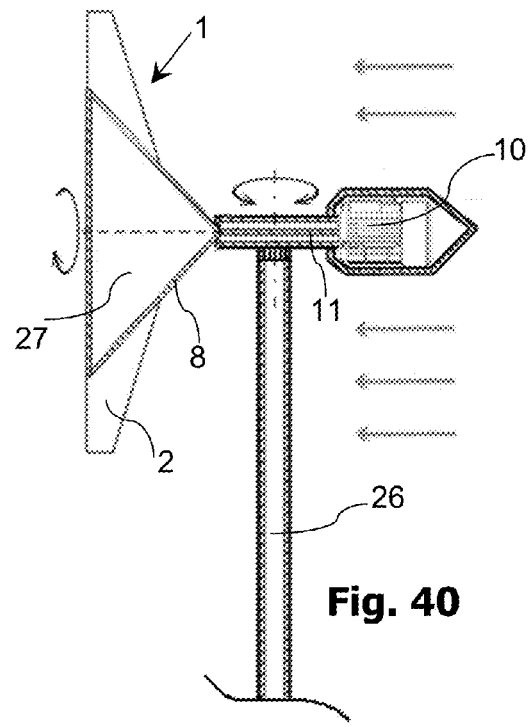
Figure 41:
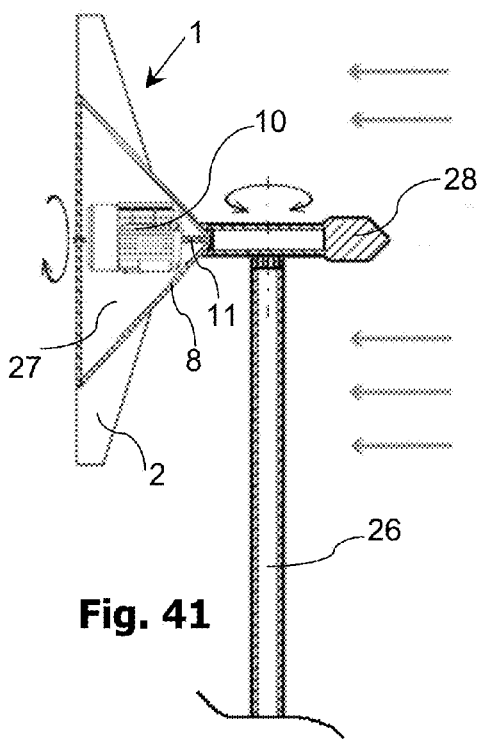
Figure 42:
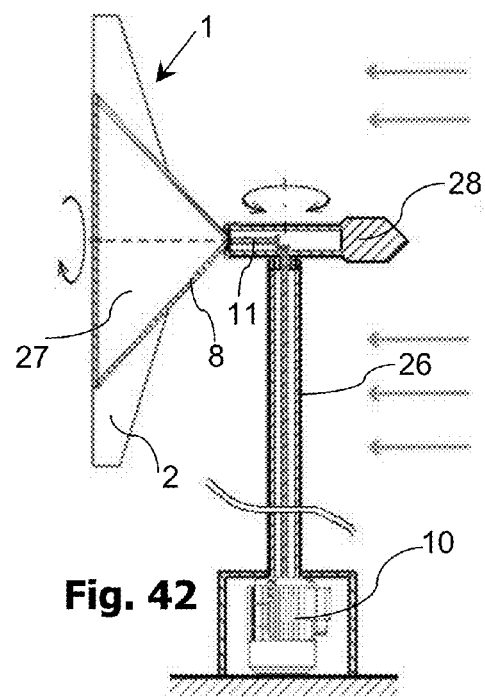

FIGS. 40-42 show a vertical cross-section of the inventive apparatus arranged on top of said supporting element where the impeller 2 of the turbine 1 and its axle 11 are rotatable around a substantially horizontal axis, with the impeller 2 having a central cone 28 which forms the wind deviating element 8, while the entire apparatus is rotatable about the vertical axis of the supporting element 26 in a direction of wind flow under the action of wind forming the horizontally rotating apparatus. The generator can be located on another opposite side of the supporting element 26 (FIG. 40), inside the central cone 27 of the impeller 2 with a counterweight 28 located on another opposite side of the supporting element 26 (FIG. 41), and inside or at the base of the supporting element with or without the counterweight 28 located on another opposite side of the supporting element 26 (FIG. 42).

Figure 43:
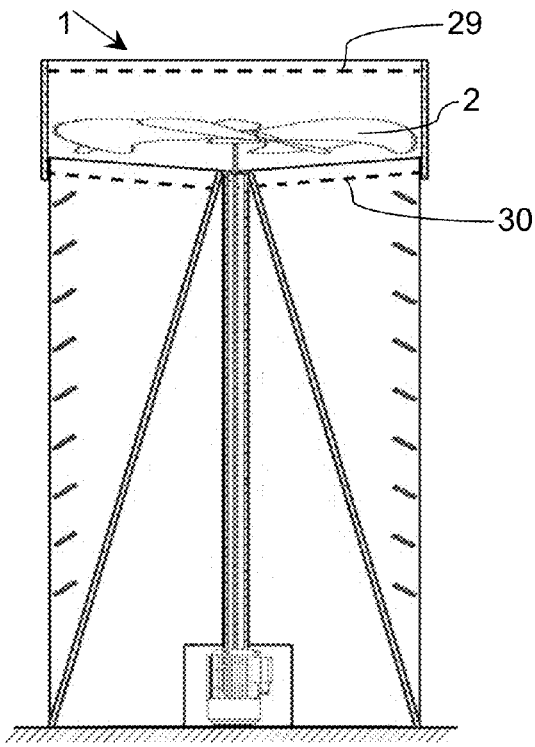
FIGS. 43 and 44 are views of the inventive apparatus showing the bird-protecting elements.
Figure 44:
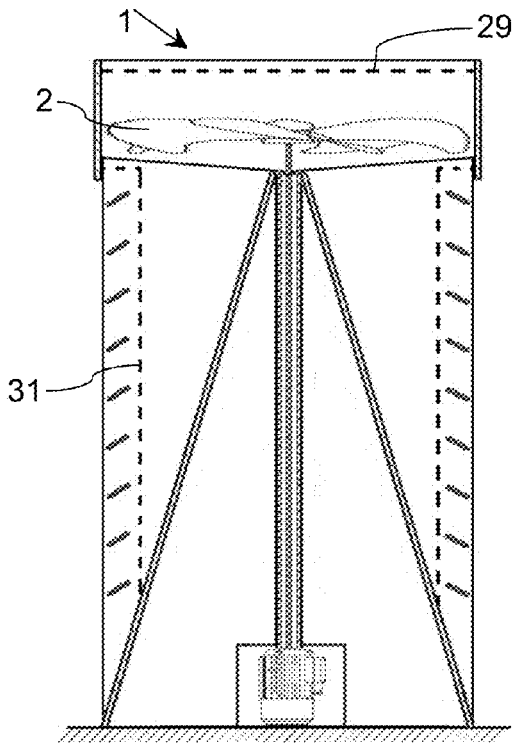

FIGS. 43 and 44 show a grid of a bird-protecting element 29, 30, and 31 in a form of a mesh or a net with openings that are large enough not to significantly affect the wind-flow, and small enough to restrict people, birds or other wildlife from getting too close to the rotating blades of the impeller 2 of the turbine 1.

Figure 45:
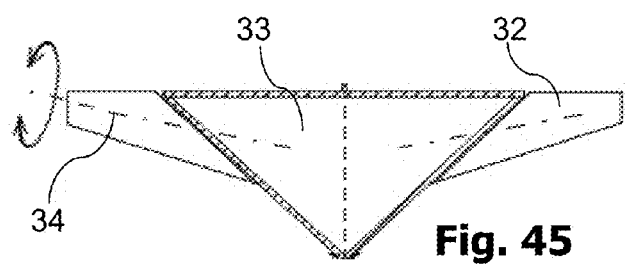
FIGS. 45 and 46 are views showing two further embodiments of the impeller blades of the turbine in the apparatus according to the present invention.
Figure 46:
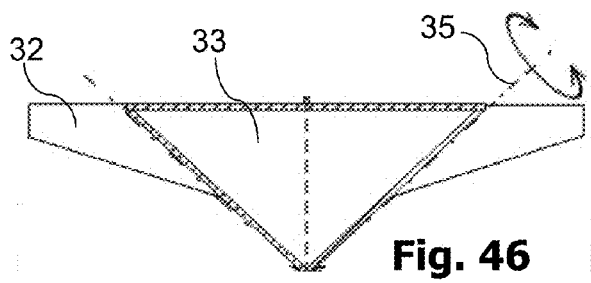

FIGS. 45 and 46 are views showing impeller blades 32 which are turnable relative to an impeller cone 33 of the turbine. In FIG. 45 the impeller blades 32 are turnable about their longitudinal axes 34, while in FIG. 46 they are turnable about axes 35 extending along the lines of connection of the blades 32 with the cone 33.

Figure 47:
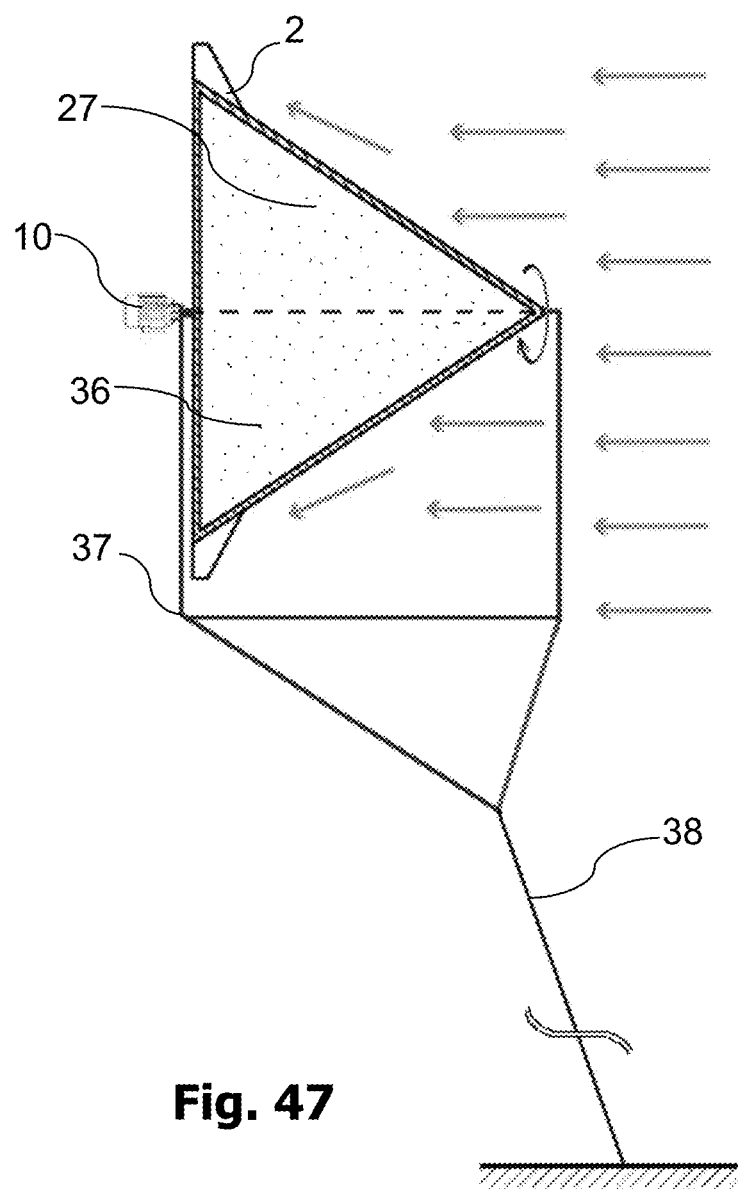
FIG. 47 is a view showing further embodiment of the impeller blades of the turbine in the apparatus according to the present invention.

The central cone 27 of the impeller 2 of the horizontally rotating apparatus can be an enclosed large hollow element made out of light flexible material as shown in FIG. 47, which can be inflated by lighter than air gases 36 that will force the entire apparatus to float above the earth surface as an aerostat. The generator 10 can be located inside or outside of the central cone, in the area of the narrow edge, the center, and the wide edge of the central cone. The entire apparatus is connected to the earth surface through a supporting frame 37 and a cable 38 connected to said supporting frame and is rotatable substantially horizontally around the connection with the rope in a direction of wind flow under the action of wind. The electricity produced by the apparatus is transferred to the earth surface through the supporting frame 37 and the cable 38.

It will be understood that each of the elements described above, or two or more together, may also find a useful application in other types of constructions differing from the type described above.

While the invention has been illustrated and described as embodied in an apparatus for generating electricity from wind power, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for generating electricity from wind power, comprising a turbine having an impeller rotatable about a substantially vertical axis and having a plurality of blades, said turbine being located in an upper part of the apparatus; a wind redirecting element which circumferentially surrounds said blades of said impeller at its height and redirects the wind around said blades and is located in the upper part of the apparatus and substantially around the blades of the impeller; a generator connected with said turbine and generating electricity in response to rotation of said impeller about a substantially vertical axis under an action of wind, said generator having a vertical shaft which is coaxial with the impeller of the turbine; a vertically extending wind directing element which directs the wind into an interior of the apparatus; and an upwardly extending wind guiding device located under said turbine and guiding the wind substantially upwardly toward said turbine, wherein said wind directing element and said wing guiding device extend upwardly substantially over a same height and along each other towards said wind redirecting element and said turbine.

2. An apparatus as defined in claim 1, further comprising a further wind directing element which extends upright and vertically and located under one side of said turbine and extends in its entirety uninterruptedly within a width of the turbine and from a lower end of the whole apparatus up to a bottom of the turbine.

3. An apparatus as defined in claim 2, further comprising an additional further wind directing element which extends upright and vertically and located under an opposite side of said turbine and extends in its entirety uninterruptedly within the width of the turbine and from a lower end of the whole apparatus up to a bottom of the turbine.

4. An apparatus as defined in claim 1, wherein said wind guiding device includes a wind guiding element attached to said wind directing element, and selected from the group consisting of at least one wind guiding element extending substantially upwardly, at least one wind guiding element extending substantially sideways, and both.

5. An apparatus as defined in claim 4, wherein said at least one substantially upright wind guiding element is a wind guiding element which is located under said impeller of said turbine, is inclined relative to a vertical plane and directs the wind from below upwardly toward said impeller of said turbine rotatable about the substantially vertical axis, wherein said wind guiding element has a lower end and upper end, and extends in its entirety uninterruptedly from said lower end to said upper end, and also from a lower end of the whole apparatus up to a bottom of the turbine, so that the wind is guided from below upwardly over and along said inclined element from said lower end to said upper end of said element and from said lower end of the whole apparatus towards said bottom of the turbine uninterruptedly, and wherein said wind guiding device is open at one side opposite to said uninterrupted inclined wind guiding element so that wind flows from outside onto said uninterrupted inclined wind guiding element over its whole height and is guided upwardly.

6. An apparatus as defined in claim 5, wherein said substantially upwardly extending wind guiding element has a plurality of openings and a plurality of further substantially upwardly guiding elements associated with said openings, so that wind entering said apparatus from below is directed upwardly through said openings toward said impeller of said turbine rotatable about the substantially vertical axis and forming a stackable unit.

7. An apparatus as defined in claim 6, further comprising a plurality of said stackable units arranged over one another in a vertical direction in a position selected from a group consisting of adjacent to a wall and a free-standing and forming a multi-level stackable unit.

8. An apparatus as defined in claim 7, further comprising a plurality of said multi-level stackable units arranged adjacent to one another in a peripheral direction around the vertical axis over a whole circumference, and having an axle extending through all said stackable units and formed as an axle selected from the group consisting of a single axle extending through all said stackable units and an axle composed of interconnected individual axles of said stackable units, and wherein said generator is connected to said axle forming a circular multi-level stackable apparatus.

9. An apparatus as defined in claim 4, wherein said wind guiding element which extends substantially sideways comprising a plurality of wind guiding plates which are spaced from one another in a substantially upright direction and inclined to a horizontal plane for guiding the wind upwardly toward said turbine, and wherein said wind guiding plates are plates selected from the group consisting of flat plates, plates curved in one side direction, and plates curved in another transverse side direction.

10. An apparatus as defined in claim 9, wherein said at least one wind guiding element extending upwardly forms a wind channel, such that said wind guiding plates guide the wind from outside into said wind channel upwardly towards said turbine.

11. An apparatus as defined in claim 9, wherein said wind guiding plates are elongated, each have an axis extending along a length of each of said wind guiding plates, and are turnable around said axis to adjust an amount and a direction of wind guided by said wind guiding plates and to block the wind flow into said wind channel when wind is excessive.

12. An apparatus as defined in claim 4, wherein said wind guiding element which extends substantially upwardly is an element selected from the group consisting of a vertical element, an element inclined to a vertical plane, a flat element, a vertically curved element, a horizontally curved element, and combinations thereof.

13. An apparatus as defined in claim 4, wherein said wind guiding device forms together with said wind directing element a unit.

14. An apparatus as defined in claim 13, further comprising a plurality of such units arranged adjacent to one another in a peripheral direction around a vertical axis over a whole circumference forming a multi-unit circular apparatus, so as to allow the wind to enter said multi-unit circular apparatus from all sides and to be directed upwardly.

15. An apparatus as defined in claim 14, wherein said multi-unit circular apparatus has a turbine selected from a group consisting of one impeller for each of said units, and a single impeller for the entire multi-unit circular apparatus with single axle located at a center of said circular apparatus.

16. An apparatus as defined in claim 14, wherein said wind guiding elements of said units together form a conical structure.

17. An apparatus as defined in claim 14, wherein said wind directing elements extend from a periphery in a direction toward said vertical axis to a center of said circular apparatus and are connected in said center in a manner selected from the group consisting of connected with each other, connected to a single central element having a cross-section selected from a group consisting of circular cross-section and multisided cross-section, and both.

18. An apparatus as defined in claim 14, further comprising a substantially vertical supporting element, wherein said circular apparatus with said turbine, said generator, said wind guiding device and an axle of said turbine are arranged on top of said supporting element and supported by said supporting element.

19. An apparatus as defined in claim 18, wherein said impeller of said turbine is located on one side of said supporting element, while said generator is located on another opposite side of said supporting element and connected with said impeller by said axle of said turbine rotatable around a substantially horizontal axis, forming a horizontally rotating apparatus.

20. An apparatus as defined in claim 19, wherein said impeller has a central cone which is a wind deviating element connected with a central part of the impeller, while the entire horizontally rotating apparatus is rotatable around a substantially vertical axis of said supporting element in a direction of a wind flow, under an action of wind.

21. An apparatus as defined in claim 20, wherein the location of said generator of horizontally rotating apparatus is selected from the group consisting of generator located on an opposite side from said turbine of said supporting element, said generator is located inside of said central cone of said impeller, while a counterweight is located on another opposite side of said supporting element, generator located inside of said supporting element and connected with said impeller by set of axles and gears, while a counterweight is located on an opposite side from said turbine.

22. An apparatus as defined in claim 20, wherein the central cone of the impeller of said horizontally rotating apparatus is formed as an enclosed hollow element which is inflatable with lighter than air gases to raise the entire apparatus above ground, wherein a location of said generator is selected from the group consisting of inside said central cone, outside said central cone, in an area of a narrow edge of said cone, in an area of a center of said central cone, and in an area of a wide edge of said central cone, while the entire apparatus is connected to an earth surface through a supporting frame and a cable connected to said supporting frame, and is rotatable substantially horizontally around a connection with said cable in a direction of wind flow under an action of wind, so that electricity produced by the apparatus is transferred to the earth surface through said supporting frame and said cable.

23. An apparatus as defined in claim 1, wherein said wind redirecting element has a peripheral wall surrounding said impeller and selected from the group consisting of a straight wall, a curved wall, a one-part wall, a multi-part wall, and a wall located at an angle to a vertical plane.

24. An apparatus as defined in claim 1, wherein said generator connected with said turbine is located at a location selected from the group consisting of under said turbine, and inside of said impeller.

25. An apparatus as defined in claim 1, further comprising wind deviating means to increase efficiency of said impeller, located in the area of said blades of said impeller and constructed such that said wind deviating means prevent wind guided by said wind guiding device from being directed toward a central part of said impeller located close to said axis and deviate the wind guided by said wind guiding device exclusively toward a remaining part of said impeller which is spaced from said axis.

26. An apparatus as defined in claim 25, wherein said wind deviating means has a wind deviating element selected from the group consisting of a wind deviating element connected with said central part of said impeller, a wind deviating element connected with said wind guiding device, and both, each of said wind deviating elements being selected from the group consisting of a vertical element, an element inclined to a vertical plane inwards or outwards, a separate element, an element which is of one piece with said turbine, and an element which is of one piece with said wind guiding device.

27. An apparatus as defined in claim 26, wherein said impeller of said turbine has central cone which is formed as said wind deviating element connected with said central part of the impeller, expanding upwardly and rotatable about said axis of said impeller, which deviates the wind away from said axis of said impeller toward said blades, with said blades attached to a surface of said central cone along a line selected from a group consisting a curved line and a straight line.

28. An apparatus as defined in claim 1, wherein each of said blades of said impeller of said turbine is turnable around its axis, to adjust a speed of wind passing through said turbine, to increase a performance of the apparatus, and to decrease or stop a rotation of said impeller.

29. An apparatus as defined in claim 1, wherein the apparatus as a whole is constructed as an apparatus selected from the group consisting of an apparatus arrangeable on a vertical support, an apparatus attachable to a wall, an apparatus forming a part of an occupyable structure, an apparatus arranged on a floatable platform and formed as a power station, a self-powered navigation buoy or a lighthouse, and an apparatus arranged on a ship as a source of its electrical power and thrust.

30. An apparatus as defined in claim 1, wherein said wind redirecting element, said wind directing element, and said wind guiding device are components selected from the group consisting of components provided with solar panels on their surface forming parts of solar cells, and without solar panels on their surface.

31. An apparatus as defined in claim 1, wherein said apparatus has a bird-protecting element.

* * * * *